Dec. 9, 1947.   J. S. PECKER ET AL   2,432,441
HUB FOR ROTARY WING AIRCRAFT AND THE LIKE
Filed July 17, 1943   8 Sheets-Sheet 1

Inventors
JOSEPH S. PECKER,
EDWIN A. PECKER,
By Mason & Mason
Attorneys

Dec. 9, 1947.  J. S. PECKER ET AL  2,432,441
HUB FOR ROTARY WING AIRCRAFT AND THE LIKE
Filed July 17, 1943   8 Sheets-Sheet 2

Inventors
JOSEPH S. PECKER,
EDWIN A. PECKER,
By Mason & Mason
Attorneys,

Dec. 9, 1947.  J. S. PECKER ET AL  2,432,441
HUB FOR ROTARY WING AIRCRAFT AND THE LIKE
Filed July 17, 1943  8 Sheets-Sheet 5

Dec. 9, 1947. J. S. PECKER ET AL 2,432,441
HUB FOR ROTARY WING AIRCRAFT AND THE LIKE
Filed July 17, 1943 8 Sheets-Sheet 6

Inventors
JOSEPH S. PECKER,
EDWIN A. PECKER,

Dec. 9, 1947.  J. S. PECKER ET AL  2,432,441
HUB FOR ROTARY WING AIRCRAFT AND THE LIKE
Filed July 17, 1943  8 Sheets-Sheet 7

Inventors
JOSEPH S. PECKER,
EDWIN A. PECKER,

Patented Dec. 9, 1947

2,432,441

UNITED STATES PATENT OFFICE 2,432,441

HUB FOR ROTARY WING AIRCRAFT AND THE LIKE

Joseph S. Pecker and Edwin A. Pecker, Philadelphia, Pa.

Application July 17, 1943, Serial No. 495,196

19 Claims. (Cl. 244—17)

This invention concerns an aircraft of the rotary wing type, power driven or by autogyration. Such an aircraft is sustained in flight when power driven, i. e., both vertical and horizontal motion, or a combination of such motions being obtained by rotor blades which are supported and driven by a vertical shaft actuated by the aircraft engine.

An object of the invention is to provide means by which a plurality of adjustments may be made both with regard to the plane of rotation of said blades, and to the pitch of said blades.

Another object of the invention includes the provision of means selectively operable to lock each pair of blades against relative rotation, or to rotate each pair of blades in opposite directions for increasing the pitch of one blade and for decreasing the pitch of the other blade of that pair during the rotation of the hub and while the aircraft is in flight or on the ground, to thereby change the plane of rotation in which all of the blades are rotated.

A further object of the invention is to provide easily controllable means for changing while in flight, the plane of rotation of said blades by changing the pitch of the blades at least one pair of blades, i. e., the blades having the same longitudinal axis.

A still further object of the invention is to effect the above movements by easily controlled manual and/or power operated means located within the fuselage of the aircraft.

Further objects will appear hereinafter throughout the specification.

In rotary wing aircraft such as the helicopter or Autogiro type, a plurality of blades are mounted for rotation about a common axis, located above the fuselage of the aircraft. The efficiency of these blades, i. e., their ability to maneuver the aircraft, and perform other functions, all contribute to the characteristics of the aircraft itself.

The hub herein described is intended to meet any one of a number of conditions which may be encountered during taking off, or when landing from a supporting surface, such as the ground, or which must be met during flight. In order to provide a plurality of blades which will impart to the aircraft maximum maneuverability characteristics, even under the most difficult conditions, the accompanying drawings illustrate and the following description sets forth a structure which includes two or more blades which rotate in the same plane. For purposes of illustration, two pairs of blades are shown, the two opposite blades of each pair being hinged upon a common center. It is to be understood, however, that with slight modification and entirely within the scope of this invention, each pair of blades may be mounted in a separate plane, or only two blades may be used.

By the present invention the operator or navigator may at will, cause only two opposite blades forming one pair, to turn about their common axis (or to change pitch), without affecting the pitch of the other pair of blades, which may remain in the position of pitch in which they have been previously adjusted. The pitch change of one or both pairs of blades may be made either in sequence or simultaneously, or a pitch change of one pair may be made, and all of said pitch changes may be effected while the aircraft is on the ground, or while in flight, and while the hub is being rotated, or even while stationary. Additionally, the individual pitch of each blade may be altered simultaneously from a zero angle, to any pitch desired, such as to an autogyration angle.

The hub of this invention permits angular adjustment of each pair of blades whereby said blades may rotate about their common center, but in opposite directions. When a pair of blades has been adjusted, the rotation of said pair of blades automatically sets the plane of rotation of said blades.

Figures 1, 2:
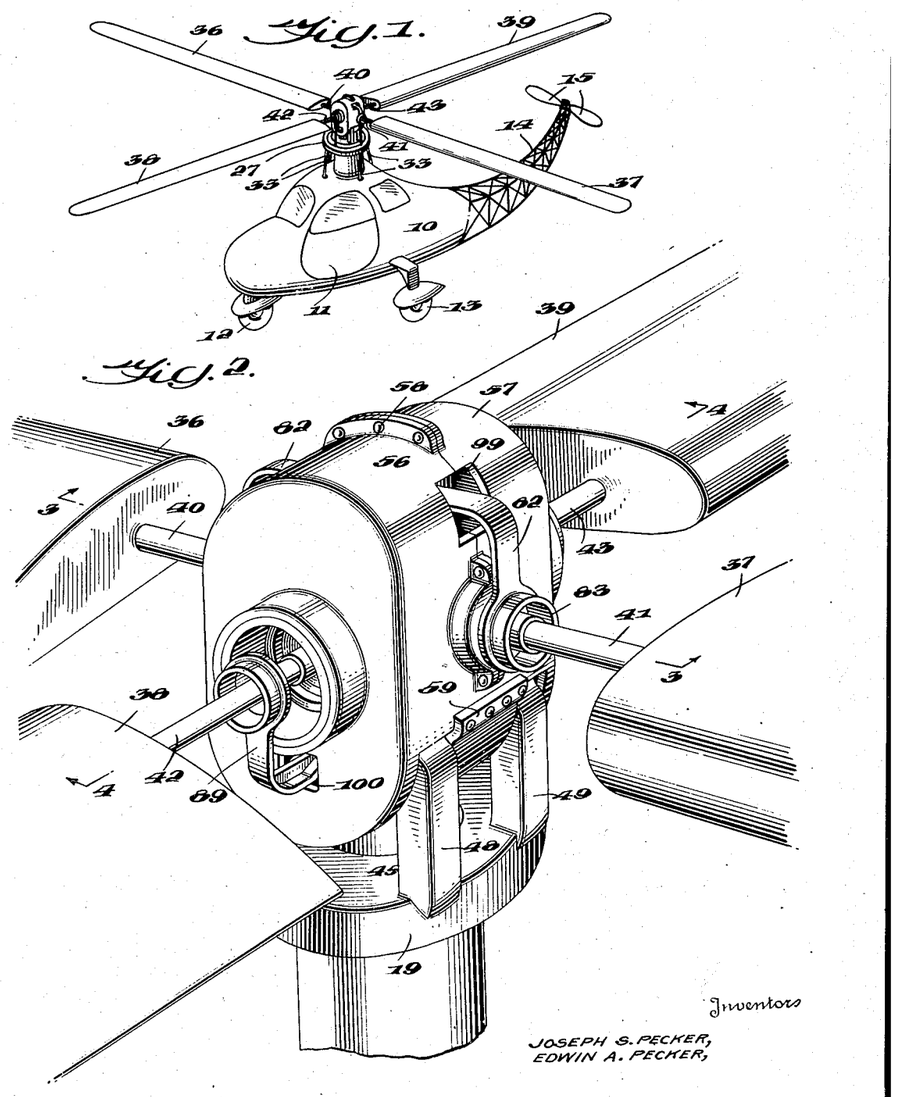
Figure 1 is a perspective view of a rotary wing aircraft of the general type to which this invention is particularly adapted.
Figure 2 is a perspective view of a hub for rotary aircraft constructed according to this invention, with the blades, or wing spars abbreviated, and without the swash plate and control rods, for purposes of clarity.

In the drawings, the fuselage 10 is provided with doors 11, only one of which is shown, and with tricycle landing gear comprising a forward wheel unit 12 and side wheel units 13, only one of the latter being shown. Any suitably constructed tail spar or boom may be provided, but we have shown an openwork or truss type boom 14 which extends rearwardly from the fuselage and supports the anti-torque propeller 15. This propeller is driven by a shaft which may be connected with the main engine of the aircraft, or with any other suitable source of power, not shown.

The rotor drive shaft 16 is driven by the engine, not shown, but which is preferably located within the fuselage 10, and this shaft is rigidly connected by bolts 17 and 18 with the two-part rotor housing, generally indicated as 19. The rotor housing 19 is rotatably supported by the support bracket 20 which is provided with suitable side bearings having their inner raceway 22 mounted in sleeve 23 which is rigid with the shaft 18, and an outer raceway 24 which is housed in the bracket 20. Rockably connected by pins 25 with the rotor housing 19 is the inner rotary ring 26 of the swash plate 27. The outer rotary ring 28 of the swash plate is connected by pins 29 with the inner rotary ring 26 for rocking movement about an axis substantially perpendicular to the axis defined by the pins 25.

The outer rotary ring 28 is provided with a peripheral groove 30 rotatably receiving a complementary key 31 integral with the stationary (non-rotatable) ring 32 of the swash plate.

The swash plate may be tilted by the pilot from within the fuselage cabin by means of control rods 33, shown to be four in number. Tilting movement of the swash plate is transmitted through two sets or pairs of control links 34 and 35. Each pair of links is connected to one of the two control yokes of the hub, whereby the pitch of the pairs of rotor blades 36, 37 and 38, 39 may be controlled, and for controlling the angle of incidence of the rotor wing system as a whole, which blades are mounted, respectively, on shafts or spars 40, 41, 42 and 43.

The upper portion of the rotor housing 19 is made up of two semi-circular shelf portions 44 and 45, each of which is integral with a section of said housing. The shelf portion 44 rigidly supports the legs 46, 47, and the other half shelf portion supports the legs 48 and 49. Legs 46 and 47 each support the one-half block section 50, the other two legs 48 and 49 supporting the other identically shaped block section 51.

Figures 10, 11:
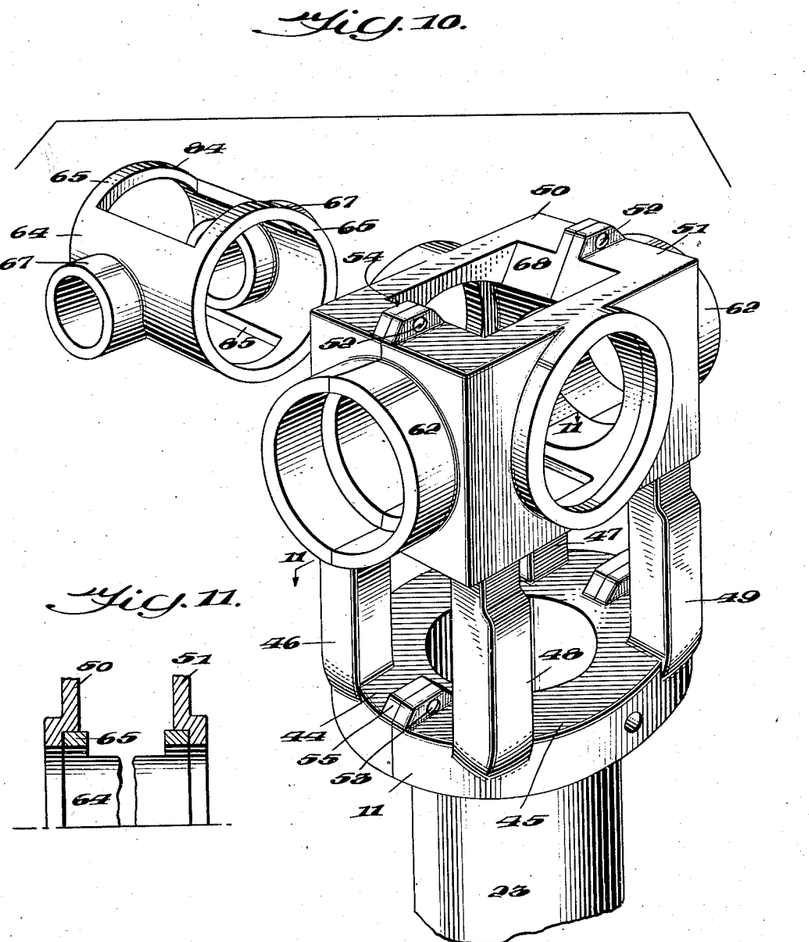
Figure 10 is a disassembled perspective view of certain parts hereinafter described.
Figure 11 is a sectional view of certain parts taken on the line 11—11 of Figure 10.

It will therefore be noted that the two block sections 50, 51, together with the legs, the two-part sleeve 19, and the semi-circular shelves, are composed of identical parts, which parts when assembled as shown in Figure 10 may be secured together with suitable fastening means, such as the screws 52, 53, which extend through the bosses 54 and 55 formed on the block sections 50 and 51, and the shelf portions 44 and 45, respectively. It will be appreciated that all of the parts numbered 16, 19 and 44 to 53, respectively, are fixed to and rotate with the engine drive shaft 16. It will be understood also, of course, that a suitable clutch and change-gear mechanism may be interposed between the engine and the shaft 16, if desired.

Figure 4:
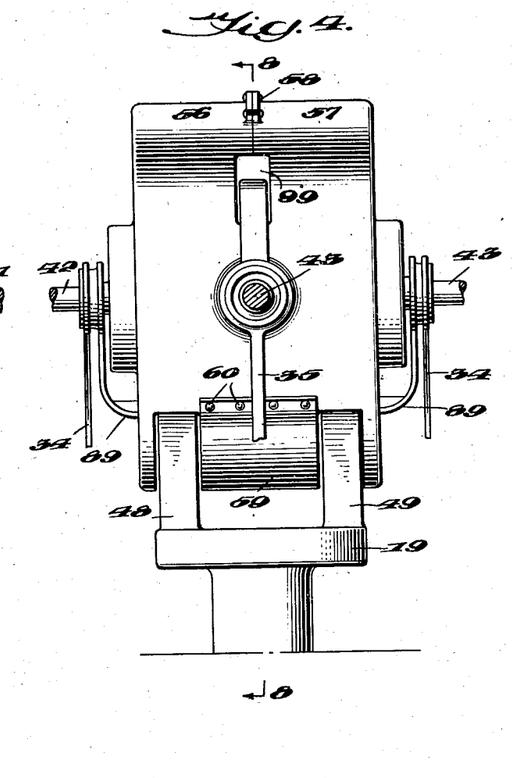
Figure 4 is a side elevation of the hub.
Figures 5, 6, 12:
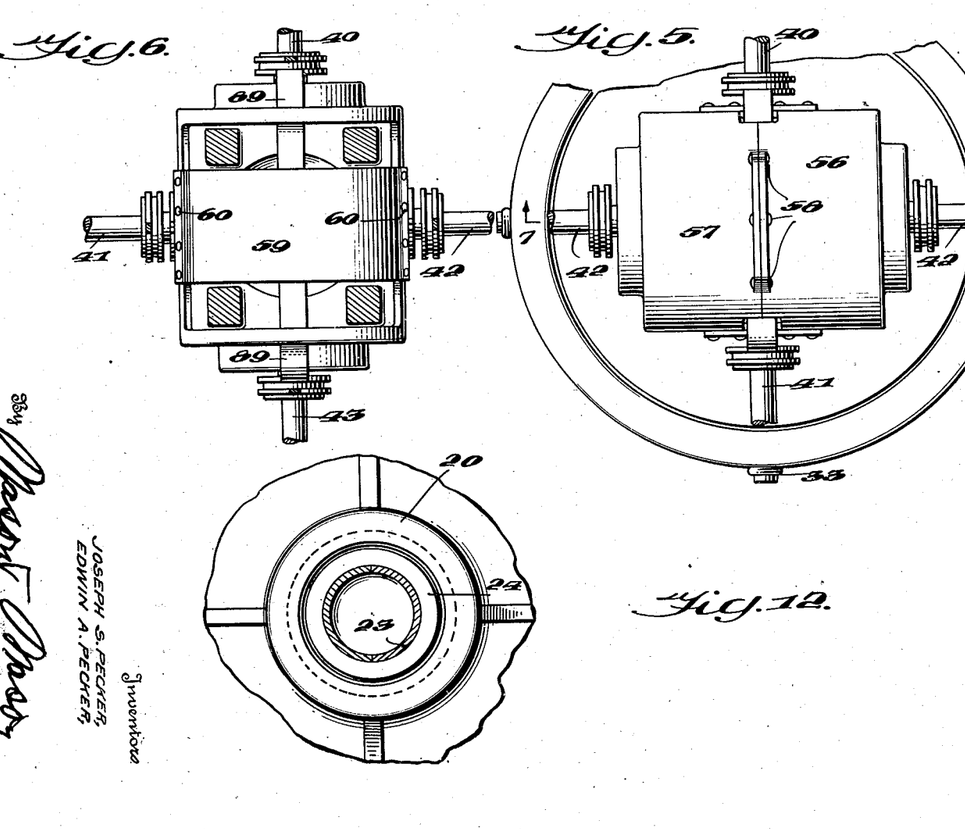
Figure 5 is a top plan view of the hub, certain parts being broken away.
Figure 6 is a bottom plan view taken on the line 6—6 of Figure 3.
Figure 12 is a view partially in section taken on the line 12—12 of Figure 8.
Figure 8:
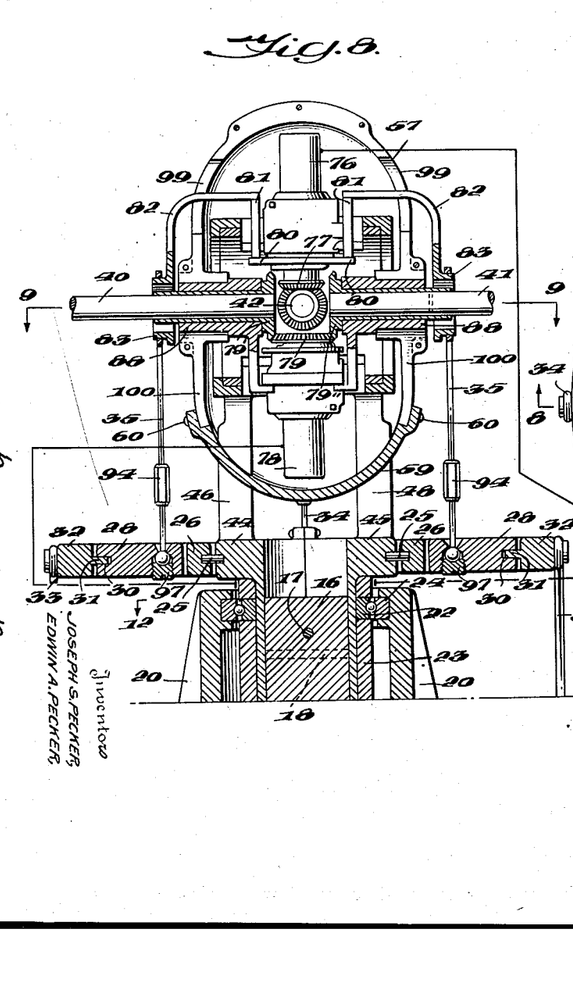
Figure 8 is a vertical sectional view taken on the line 8—8 of Figure 4.

Supported on the block sections when assembled, is a two-part hub casing having half portions 56, 57. These portions are fastened by suitable fastening means 58 which extend through flanges. Fastened to the bottom of these half portions is a bottom portion 59 which is fastened by a fastening means 60 to the half sections, as shown in Figures 4, 6 and 8. The half portions are each provided with flanges 61 which seat on stepped portions 62 of the block sections 50 and 51, as shown in Figure 9.

Figure 9:
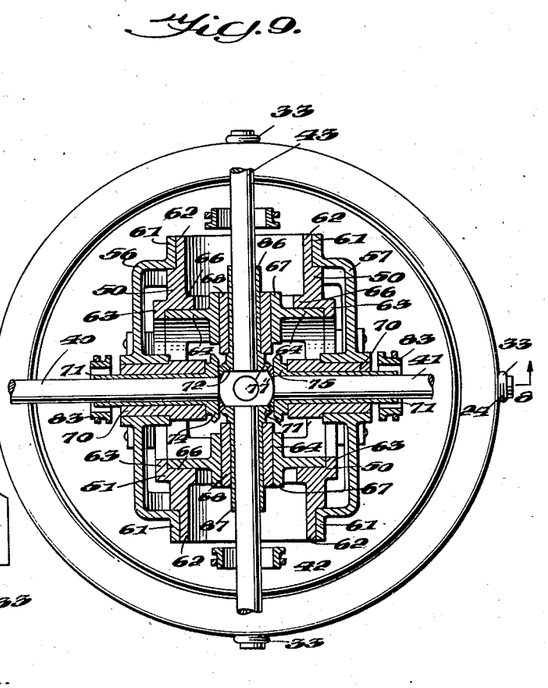
Figure 9 is a horizontal sectional view taken on the line 9—9 of Figure 8.

The block sections when assembled, as shown in Figure 9, provide circular shoulders 63 which prevent sidewise movement of the circular housing 64 shown disassembled in Figure 10. This circular housing is provided with bearing sleeves 65 which snugly fit within bearing portions 66 of the block sections. The circular housing is further provided with extensions 67 extending at right angles to said bearing sleeves. Said extensions form housings for bearing sleeves 68. Extending at right angles to the extensions 67, as shown in Figure 9, are openings in the half portions 56 and 57, which house bearing bushings 70. There are also aligned openings, spherical in cross section, numbered 84 and 85, which permit limited movement of the pitch control units hereinafter described. It will therefore be noted from Figure 9 that each of the four shafts is provided with its own bearing sleeve. Keyed to each shaft are inner bearing sleeves 71. Each sleeve has fixed to its end a gear 72, 73, 74 and 75.

As indicated in Figure 8, two standard variable pitch units are located, one above and one below the shafts 40, 41, 42 and 43, with their attached gears. The upper pitch control unit which may be an electric motor or a fluid motor, is indicated by the numeral 76, and has attached to its shaft a gear 77 which meshes with gears 77' and 77", located on the ends of shafts 42 and 43, respectively. When said upper pitch control unit 76 is energized through the gears 77, 77' and 77", it rotates the shafts 42 and 43 in opposite directions.

Similarly, the lower pitch control unit 78 when energized, rotates the shafts 40 and 41 in opposite directions, due to the fact that its gear 79 meshes with gears 79' and 79" on the ends of the shafts 40 and 41, respectively. This relative rotation or rocking movement in opposite directions occurs about an axis common to the shafts 42 and 43 when the upper pitch control unit 76 is energized, and a similar movement occurs with regard to shafts 40 and 41 when the lower pitch control unit 78 is energized. Hence, the pitch of each pair of blades attached to said shafts 40 and 41, or 42 and 43, will be equally increased. Upon rotation of the gear of either pitch control unit, the pair of blades which it drives will be simultaneously equally increased or decreased in pitch.

As will be noted from an inspection of Figures 7 and 10, each block section is provided with inclined side walls 68 for reasons hereinafter indicated.

A brake (not shown), may be applied to the drive shaft of each unit, whereby its gear 77 or 79 may be locked against rotation. We have not shown the brake because said brake is well known in this art and is what has been termed a variable pitch propeller unit, and includes a propeller gear reduction unit, a motor, and a brake such as shown in numerous patents in the art of variable pitch propeller blades.

When the circuit is completed to each motor, the brake is released and the brake of each motor is locked as soon as power is cut off.

When the brake is applied to the drive shaft of the unit 76, the gear 77 is locked against rotation, and the unit 76 and the shafts 42 and 43, which are locked because the locked gear 77 is in mesh with the gears 77' and 77'', may have tilting force applied, which tends to rock the blades 38 and 39 in the same direction, this force being applied through the control yoke of the unit 76, as will hereinafter appear. When this tilting force becomes effective in one direction, it causes the pitch of the blade 38 to be increased and the pitch of the blade 39 to be decreased. When this tilting force becomes effective in the opposite direction, it causes the pitch of the blade 38 to be decreased and the pitch of the blade 39 to be increased. During these applications of tilting force, circular unit 76 rocks clockwise or counterclockwise, as in Figure 8, about the common axis of shafts 42 and 43. When the brake is applied and when rocking movement occurs, the tilting force causes the pair of shafts, either 42 and 43 to rock or rotate in the same direction, and it will be understood that both actions may take place at the same time.

The means for applying this tilting force comprises the upper tilting yoke formed by the brackets 80 which are integral with the inner portion of the housing of the upper pitch control unit 76 (Figure 8), to which are secured upstanding studs 81 having the inner ends of arcuate arms 82 rigidly secured thereto.

Figure 13:
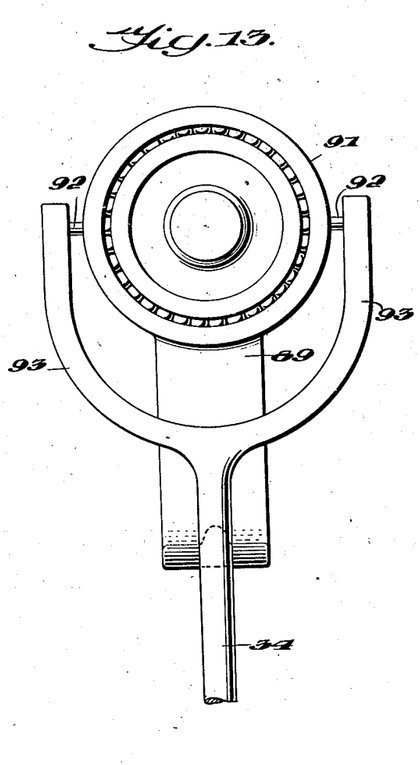
Figure 13 is a side plan view of certain parts, taken from the left hand side of Figure 8.
Figure 14:
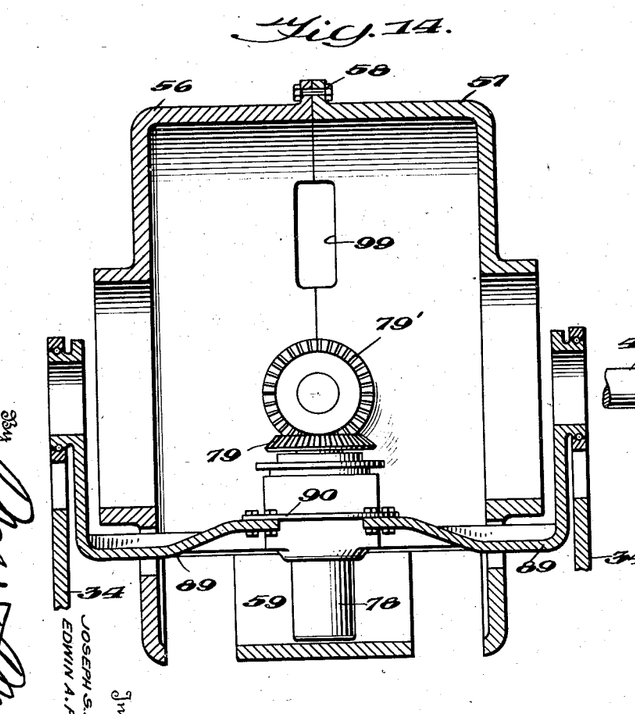
Figure 14 is a vertical sectional view similar to Figure 7, but showing only the lower control unit and its tilting means.
Figure 15:
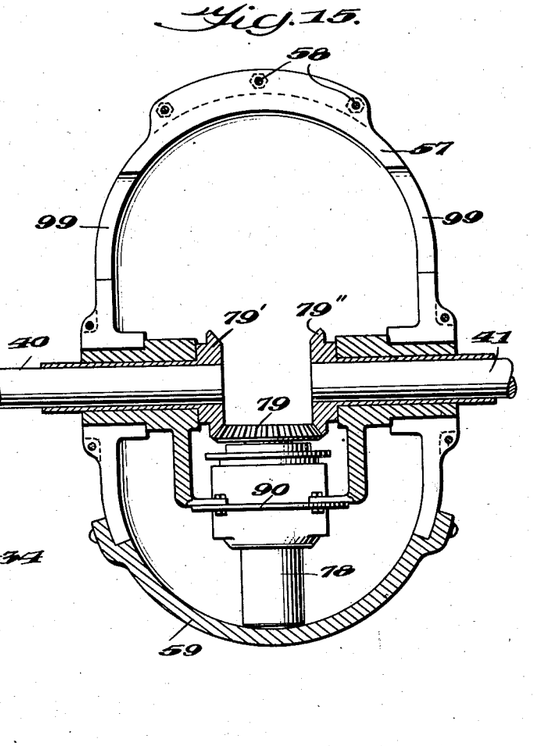
Figure 15 is a vertical sectional view of the parts shown in Figure 14, but taken at right angles thereto.

The outer ends of the arms 82 are provided with clearance loops 83 with outwardly directed flanges forming the inner raceway of a ball bearing unit, having an outer raceway to which the arms of the upper forked end of the control links 35 are pivotally connected (the similar lower control unit hereinafter described is shown in detail in Figure 13). Thus, when the outer stationary ring 32 of the swash plate, shown in Figures 7 and 8, is tilted in the appropriate direction by the pilot of the aircraft, through the control rods 33, tilting force is exerted through the control links 34, tending to tilt the common plane of the axis of blades 36, 37, 38 and 39 about the axis of shafts 40 and 41. Since the common plane of the axes of blades 36, 37, 38 and 39 represents the plane of rotation of the rotary blades, this tilting force tends to change the angle of incidence, or angle of attack thereof. It will be appreciated that when it is desired to cause the aircraft to move straight up or when coming down, the plane of said blades is substantially horizontal, as shown in Figure 1.

Figure 7:
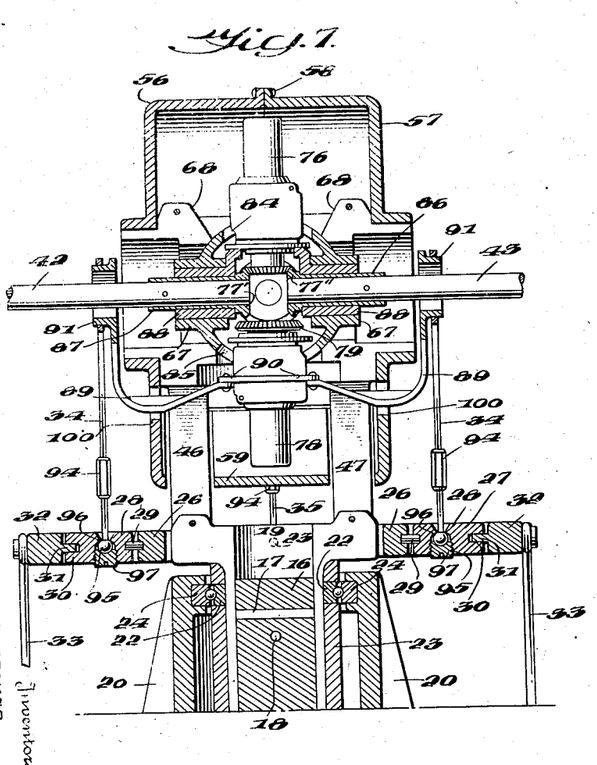
Figure 7 is a vertical sectional view taken on the line 7—7 of Figure 5.

Secured to the inner end of the shaft 43 is the bearing sleeve 86 of the gear 77'', as shown in Figure 7. Likewise, the bearing sleeve 87 of the gear 77' is fixed to the shaft 42. These sleeves are journaled in bearing bushings 88 forming part of extensions 67 of the circular housing 64 (Figure 10). Bearing bushings 88 form a support cradle for the lower pitch control unit 78, which is similar to the above described upper pitch control unit 76. The gear 79 is locked against relative rotation when the unit 78 is deenergized and the brake applied to the drive shaft of this unit. Then, if the unit 78 has tilting force applied in either direction by means hereinafter described, the gears 79' and 79'' and attached shafts 40 and 41 are rocked as a unit about the common axis of the shafts 40 and 41, i. e., clockwise, or counter-clockwise, as seen in Figure 8. This swinging movement of the unit 78 about the axis of shafts 40 and 41 is limited by the clearance provided by the lower clearance opening 85 in the circular housing 64, shown in Figure 7.

When the unit 78 is energized to rotate the gear 79 in either direction with the brake of said unit being off, the gears 79' and 79'' and attached shafts 42 and 43 are rocked in opposite directions, reversely, either to increase the pitch of the rotor blades 38, 39 on both shafts 42 and 43, or to decrease the pitch thereof, simultaneously.

Thus, the pitch control unit 78 comprises means selectively operable to lock the shafts 42 and 43 against relative rotation and to thereby cause said shafts to be rotated in the same direction when said unit 79 is rocked clockwise or counterclockwise, as seen in Figure 7. Or reversely, and when the brake is released from the unit 78, and said unit is energized, to increase or decrease the pitch of the blades 38 and 39 on the shafts 42 and 43, concurrently. The pitch control unit 76 performs the same function with respect to the shafts 40 and 41 and the blades 36 and 37 fixed thereon.

Figure 3:
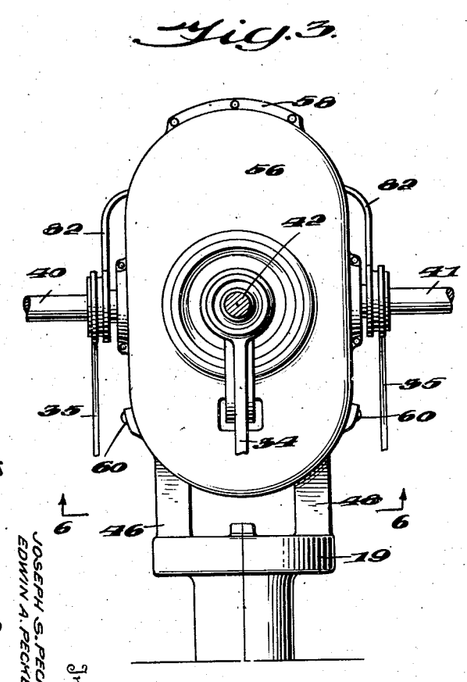
Figure 3 is an end elevation of the hub.

The means for applying tilting force tending to tilt the lower pitch control unit 78 about the common axis of the shafts 40 and 41, i. e., clockwise or counter-clockwise, as seen in Figure 7, comprises the lower tilting yoke formed by a pair of similar arms 89 having their inner ends secured to brackets 90 on the casing of the lower pitch control unit 78. These arms extend downwardly and outwardly from the brackets beyond the walls of the casing 56, 57, thence upwardly to terminate in clearance loops 91 surrounding the shafts 42 and 43. These loops are each flanged to form the inner race of a ball bearing assembly (Figure 13), each having its outer race pivotally connected at 92 with the upper forked end 93 of the link 34. It will be understood that the control link 35 is formed with a forked end not shown, similar to the link 34, shown in Figure 13, and the forked end is connected with the clearance loop of the arms 82, as shown in Figure 3.

Similarly, motor 76 has a support 80 to which arms 81 are attached at one of their ends, the opposite ends of these arms being attached to the upper tilting yoke formed by a pair of similar arms 82. Links 35 are connected by means of ball bearings to the hollow circular ends 83 of the arms 82.

The control links 34 and 35 are each formed of two parts which are connected by turn-buckles 94, and the lower ends of the links 34, 35 are spherical as indicated at 95. These spherical ends are adapted to engage in an aperture forming a spherical seat portion 96 located in the outer rotary ring 28, as indicated in Figures 7 and 8. The lower part of the aperture is provided with a screw plug 97 having a ball seat in its upper surface. Thus, a ball and socket connects the control links 34 and 35 with the outer rotatable ring 28 of the swash plate 27.

The angle of rotor inclination is the angle between the plane of blade rotation defined by blades 36, 37, 38 and 39 with regard to the horizon or the terrestrial horizontal plane.

*Operation*

Figures 16, 17, 18:
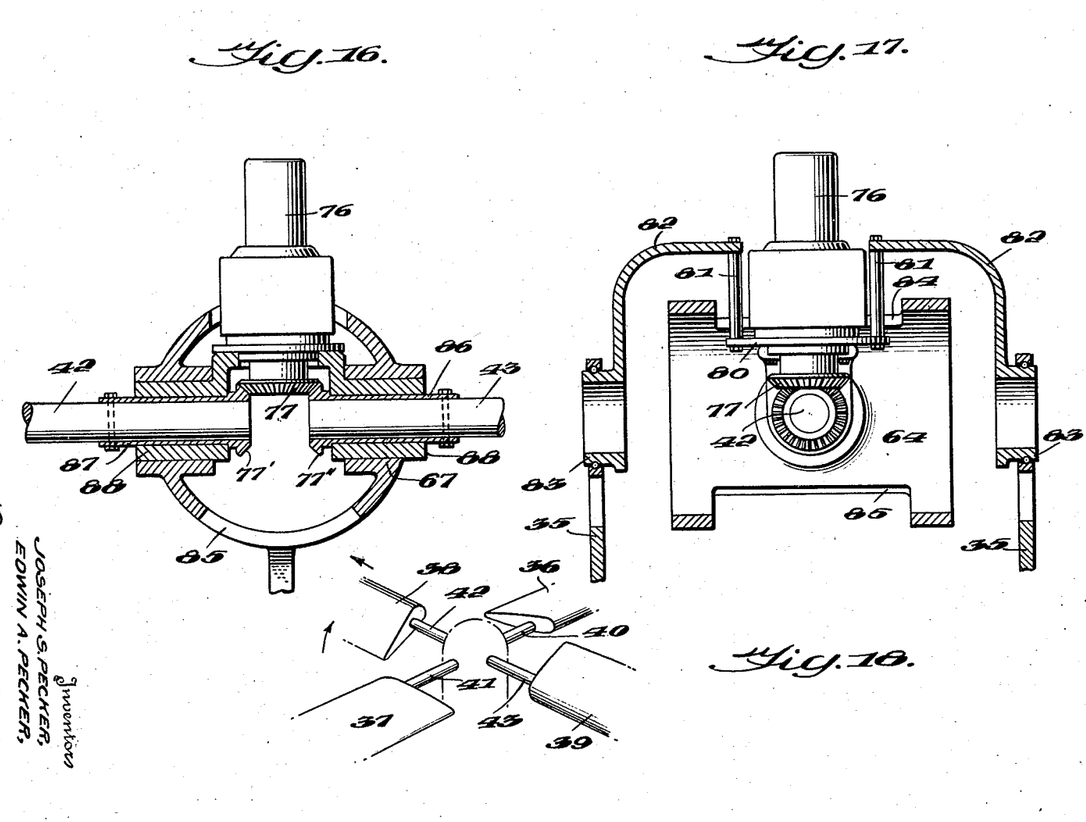
Figure 16 is a vertical sectional view similar to Figure 7, but omitting all parts but the upper control unit, its supporting structure and its driving connections to the shafts.
Figure 17 is a vertical sectional view similar to Figure 8, but omitting all parts but the upper control unit, its driving connections to the shafts, and its tilting means.
Figure 18 is a diagrammatical view showing the relative positions of the blades when the aircraft is in flight.

In order to cause the aircraft to move forwardly or rearwardly, or any other translational movement, the swash plate is actuated as stated above. Assuming that the blades are rotating in a horizontal plane and that the pitch of each blade is zero, as shown in Figures 1 and 2, and it is desired to move forwardly, the swash plate is actuated so as to cause each pair of blades to have its pitch angle changed cyclically as the blades revolve on shaft 18. This continuous change of pitch angle is the "feathering" of the blades. The continued rotation of the blades after the pitch angle has been changed to three degrees, causes the blades to assume the position shown in Figure 18. In this position the leading edge of blade 38 is elevated and its trailing edge is depressed and the opposite blade 39 has its leading edge depressed and its trailing edge elevated. Blades 36 and 37 which now extend at right angles to the direction of the straight arrow, in this position are at zero pitch. Assuming that the blades are rotating clockwise as indicated by the curved arrow in Figure 18, when the blade 37 reaches the position where the blade 38 is shown, its inclination is the same as that shown for blade 38, and blade 37 has now moved to the position of blade 36 with its angle of inclination at zero pitch. Blade 36 has moved to the position indicated by blade 39 and its pitch is the same as that of blade 39 in Figure 18, and blade 39 has moved to the position of blade 37 and its angle of inclination is at zero pitch. The general result is to shift the center of lift of the rotor as a whole.

Substantially simultaneously with the adjustment of the pitch angle blades, and due to the universal support of the shafts 40 and 41, and 42 and 43, the adjustment has automatically caused the plane of rotation of the four blades to be changed. In other words, the manual changing of the pitch angle of the blades has caused the entire plane of rotation to be changed. The greater the adjustment pitch angle the greater will be the tendency of the angle of the plane of rotation to the horizontal. It will therefore be understood that each blade will feather twice during each revolution of said blade, or in other words, during the time each blade has made a complete revolution with the drive shaft 16 as a center.

The balancing of the load and the pitch of the blades automatically sets the angle that the plane of rotation of said blades bears to the horizontal plane.

When viewing the aircraft from a point directly in front, and assuming that the swash plate has been adjusted for translational flight, and with the blades rotating, it will be noted that a tendency exists to produce see-sawing of the blades.

Each blade starting from its high point, i. e., the greatest angle of attack to which it has been adjusted by the swash plate, gradually decreases in angle and as it reaches one-quarter of a revolution, its angle of attack becomes zero. At the half revolution point the leading edge of the blade is at its lowest negative angle and at the three-quarter mark the leading edge is at the same position as at the one-quarter revolution point. During this time, i. e., a 360° revolution about the shaft, each blade "feathers" twice, that is, rotates in one direction and back, then in the other direction and back, where its angle of attack becomes zero.

The above statement of operation has assumed that the pitch control units have been locked so that their gears 77 and 79 cannot rotate. Also assuming that a pair of blades have been adjusted so that the pitch angle is three degrees from a horizontal plane of the blades which are supported on shafts 40 and 41, upon release of the brake of the unit 78 and upon energization of said unit, the blades on said shaft may be adjusted so that one of said blades will have a zero angle of pitch and the other blade will have a six degree pitch angle, whereas in the same position before said adjustment, each blade had a three degree pitch angle.

By reference to Figures 2, 3 and 8, it will be noted that the casing 56, 57 is provided with apertures 99 and 100 for accommodation of the arms 82 and 89, respectively.

While we have shown all the shafts 40, 41, 42 and 43 as being mounted in the same plane, it is to be of course understood that it is within the scope of this invention to provide alternately only one pair of blades, or two pairs of blades, the shafts 40 and 41 rotating in one plane, and locate the shafts 42 and 43 so as to rotate in a plane either above or below the plane of rotation of said shafts 40 and 41.

The word "pitch" as used in the claims relates to the angularity of the individual blades with respect to the plane of rotation of said rotary blades, and the angle of inclination of the rotary blades or plane of the same, as used in the claims, is the angle of the plane of rotation of said rotary blades with respect to the horizon or the terrestrial horizontal plane.

It will be understood that the above description and the accompanying drawings illustrate only one form of the invention, and that we do not desire to be limited in the practice of this invention except as defined by the appended claims.

Having thus described our invention, what we claim is:

1. In a rotor hub for rotary wing aircraft, means for rotating said rotor hub, a pair of aligned blades, each having a shaft mounted in said rotor hub rockable about a common axis, a second pair of aligned blades, each having a shaft mounted in said rotor hub rockable about a second axis coplanar with said first named axis, and manually controlled means for changing the mean pitch of one pair of blades without affecting the mean pitch of the other pair of blades.

2. In a rotor hub for rotary wing aircraft, means for rotating said rotor hub, a pair of aligned blades, each having a shaft mounted in said rotor hub rockable about a common axis, a second pair of aligned blades, each having a shaft mounted in said rotor hub rockable about a second common axis perpendicular to said first named axis, and means for changing the mean pitch of one pair of blades without affecting the mean pitch of the other pair of blades.

3. In a rotor hub for rotary wing aircraft, means for rotating said rotor hub, a pair of aligned blades, each having a shaft mounted in said rotor hub rockable about a common axis, a second pair of aligned blades, each having a shaft mounted in said rotor hub rockable about a second common axis, power means directly connected to the blade shafts for causing mean pitch change, and cyclic pitch changing means connected to the said power means.

4. In a universal hub, means for rotating said hub, a pair of aligned blades, each having a shaft mounted in said rotor hub rockable about a common axis, a second pair of aligned blades, each having a shaft mounted in said rotor hub rockable about a common axis coplanar with said first named common axis, power means directly connected to the blade shafts for causing mean pitch change of the blades, and cyclic pitch changing means connected to said power means.

5. In a hub for rotary wing aircraft and the like, a plurality of pairs of coaxial rotor wing blade carrying spars, means selectively operable to rock one pair of blade spars for varying the pitch without affecting the mean pitch adjustment of another pair of blade spars, or to lock said each pair of spars against rocking movement with respect to their common axis, and means for cyclically varying the pitch of each blade.

6. In a hub for rotary wing aircraft and the like, means for rotating said hub, a plurality of pairs of coaxial shafts supported by said hub, each shaft having a blade, manual means for cyclically changing the pitch of all of said blades, and selective means for independently rocking either pair of blades in the same direction to change the mean pitch whereby to increase or decrease the angle of attack of the blades on opposite shafts of that pair of shafts.

7. In a hub for rotary wing aircraft and the like, means for rotating said hub, a plurality of pairs of coaxial shafts supported by said hub, each shaft having a blade, manual means for cyclically changing the pitch of all of said blades, and selective means for changing the mean pitch of each pair of blades without affecting the mean blade pitch of another pair of blades to change the mean pitch whereby to increase or decrease the angle of attack of the blades on opposite shafts of that pair of shafts, said selective means including a pitch changing unit, in direct driving relation with a pair of said coaxial shafts.

8. In a hub for rotary wing aircraft and the like, means for rotating said hub, a plurality of pairs of coaxial shafts supported by said hub, each shaft having a blade, manual means for cyclically changing the pitch of all of said blades, and selective means for changing the mean pitch of each pair of blades without affecting the mean blade pitch of another pair of blades to change the mean pitch whereby to increase or decrease the angle of attack of the blades on opposite shafts of that pair of shafts, said selective means including a separate pitch changing unit for each pair of shafts, in direct driving relation with a pair of said coaxial shafts.

9. In a hub for rotary wing aircraft and the like, means for rotating said hub, a plurality of pairs of coaxial shafts supported by said hub, each shaft having a blade, manual means for cyclically changing the pitch of all of said blades, and selective means for changing the mean pitch of each pair of blades without affecting the mean blade pitch of another pair of blades to change the mean pitch whereby to increase or decrease the angle of attack of the blades on opposite shafts of that pair of shafts, said selective means including a pitch changing unit, said unit including a motor having a shaft drivingly connected to one of said pairs of shafts.

10. In a hub for rotary wing aircraft and the like, means for rotating said hub, a plurality of pairs of coaxial shafts supported by said hub, each shaft having a blade, manual means for cyclically changing the pitch of all of said blades, and selective means for changing the mean pitch of each pair of blades without affecting the mean blade pitch of another pair of blades to change the mean pitch whereby to increase or decrease the angle of attack of the blades on opposite shafts of that pair of shafts, said selective means including a separate pitch changing unit for each pair of shafts, each unit including a motor having a shaft drivingly connected to a pair of shafts.

11. In a hub for rotary wing aircraft, means for rotating said hub, a plurality of pairs of shafts mounted on said hub, blades on said shafts, independent means selectively operable to rock the blades of either pair of shafts or to lock the blades of either pair of shafts against rocking movement, and means for cyclically varying the pitch of each of said blades.

12. In a hub for rotary wing aircraft, means for rotating said hub, a plurality of pairs of shafts mounted on said hub, blades on said shafts, independent means selectively operable to rock the blades of either pair of shafts or to lock the blades of either pair of shafts against rocking movement and means for cyclically varying the pitch of each of said blades, said selectively operable means including a pitch changing unit.

13. In a hub for rotary wing aircraft, means for rotating said hub, a plurality of pairs of shafts mounted on said hub, blades on said shafts, independent means selectively operable to rock the blades of either pair of shafts or to lock the blades of either pair of shafts against rocking movement, and means for cyclically varying the pitch of each of said blades, said selectively operable means including a separate pitch changing unit for each pair of shafts.

14. In a hub for rotary wing aircraft, means for rotating said hub, a plurality of pairs of shafts mounted on said hub, blades on said shafts, independent means selectively operable to rock the blades of either pair of shafts or to lock the blades of etiher pair of shafts against rocking movement and means for cyclically varying the pitch of each of said blades, said selectively operable means including a pitch changing unit, said unit including a motor having a shaft drivingly connected to at least one pair of shafts.

15. In a hub for rotary wing aircraft, means for rotating said hub, a plurality of pairs of shafts mounted on said hub, blades on said shafts, means selectively operable to rock the blades of either pair of shafts or to lock the blades of either pair of shafts against rocking movement and means for cyclically varying the pitch of each of said blades, said selectively operable means including a separate pitch changing unit for each pair of shafts, each unit including a motor having a shaft drivingly connected to a pair of shafts.

16. In a hub for rotary wing aircraft, means for rotating said hub, a plurality of pairs of shafts mounted on said hub, blades on said shafts, means selectively operable to rock the blades of either pair of shafts or to lock the blades of either pair of shafts against rocking movement and means for cyclically varying the pitch of each of said blades, said selectively operable means including a separate pitch changing unit for each pair of shafts, each unit including a motor having a shaft drivingly connected to a pair of shafts, one of said units being mounted above and the other being mounted below said shafts.

17. In a hub for rotary wing aircraft, means for rotating said hub, a plurality of shafts mounted on said hub, blades on said shafts, manual means for changing the mean pitch of at least one of said blades without affecting the mean pitch of another of said blades, and means for cyclically changing the pitch of all of said blades.

18. In a rotary wing aircraft, a hub, means for rotating said hub, a pair of shafts mounted on said hub, blades on said shafts, means selectively operable to rock the blades of said pair of shafts or to lock the blades and said shafts against rocking movement, and means for cyclically varying the pitch of said pair of blades, said selectively operable means including a pitch changing unit for said pair of blades positioned by said cyclically varying means, said unit including a motor having a shaft drivingly connected to said shafts.

19. In a rotary wing aircraft, a hub, means for rotating said hub, a pair of shafts mounted on said hub, blades on said shafts, means selectively operable to rock the blades of said pair of shafts or to lock the blades and said shafts against rocking movement, and means for cyclically varying the pitch of said pair of blades, said selectively operable means including a pitch changing unit for said pair of blades positioned by said cyclically varying means, said unit including a motor having a shaft drivingly connected to the ends of said shafts.

JOSEPH S. PECKER.
EDWIN A. PECKER.

REFERENCES CITED

The following references are of record in the file of this patent:

UNITED STATES PATENTS

| Number | Name | Date |
|---|---|---|
| 2,256,635 | Young | Sept. 23, 1941 |
| 2,225,525 | Pitcairn | Dec. 17, 1940 |
| 2,161,801 | Daland et al. | June 13, 1939 |
| 2,256,918 | Young | Sept. 23, 1941 |
| 2,350,126 | Pitcairn | May 30, 1944 |
| 2,070,686 | Rutherford et al. | Feb. 16, 1937 |
| 1,915,855 | Hess | June 27, 1933 |

FOREIGN PATENTS

| Number | Country | Date |
|---|---|---|
| 302,752 | Great Britain | Dec. 27, 1928 |
| 293,932 | Great Britain | July 19, 1928 |
| 95,613 | Sweden | Mar. 2, 1939 |